C. H. ROCKEY.
FLOOR BOARD CLAMP FOR AUTOMOBILES.
APPLICATION FILED SEPT. 26, 1919.
1,395,359.
Patented Nov. 1, 1921.
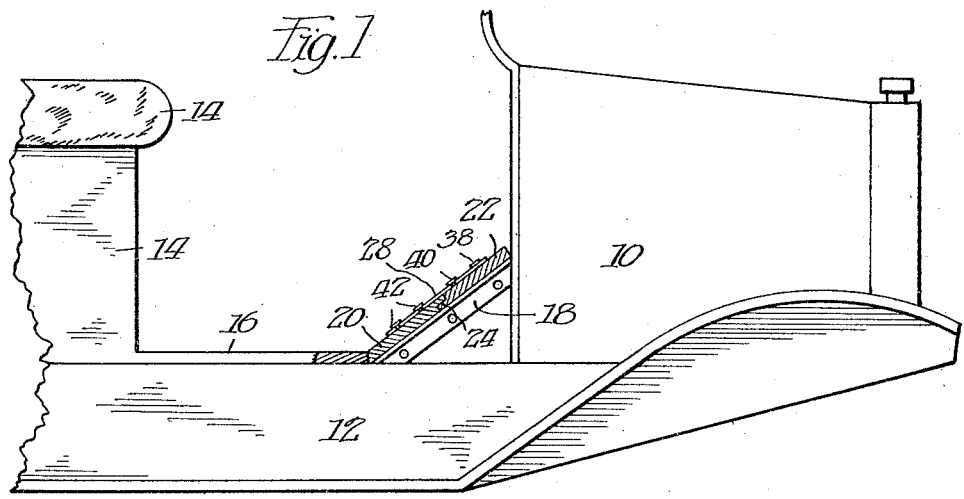
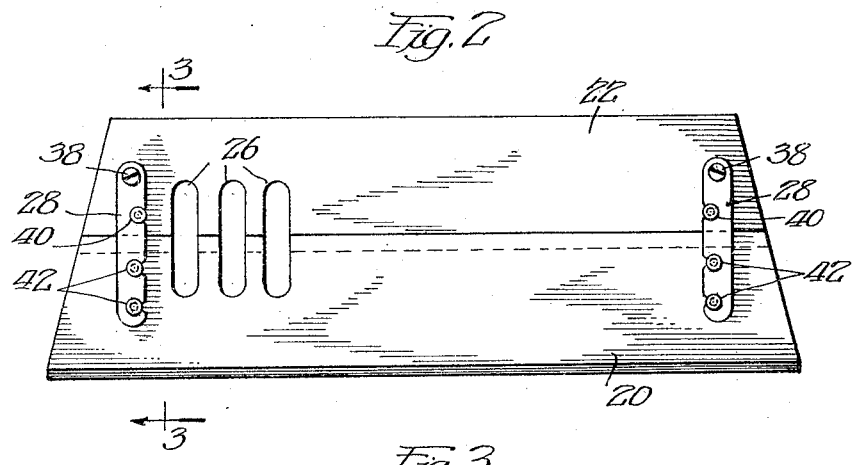
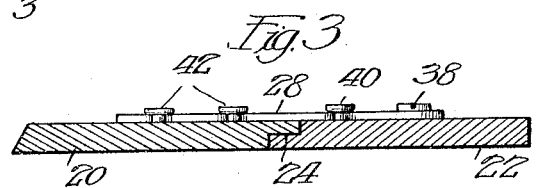
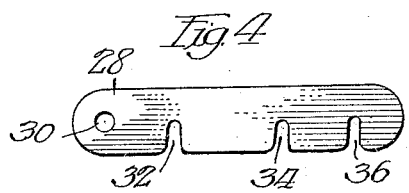
Inventor:
Clarence H. Rockey,
By Cheever & Cox
attys.

UNITED STATES PATENT OFFICE.

CLARENCE H. ROCKEY, OF CHICAGO, ILLINOIS.

FLOOR-BOARD CLAMP FOR AUTOMOBILES.

1,395,359.  Specification of Letters Patent.  Patented Nov. 1, 1921.

Application filed September 26, 1919. Serial No. 326,679.

*To all whom it may concern:*

Be it known that I, CLARENCE H. ROCKEY, a citizen of the United States, residing at Chicago, in the county of Cook and State of Illinois, have invented a certain new and useful Improvement in Floor-Board Clamps for Automobiles, of which the following is a specification.

It is customary in certain makes of automobiles to place under the feet of the driver of the car, a pair of upwardly inclined meeting floor boards through whose juncture the clutch, brake and other foot levers pass. These two boards have to frequently be removed for adjustment of the car mechanism which is immediately adjacent to their lower sides. It has heretofore been practically impossible to fasten these boards together in a detachable manner without having them come apart at inopportune times and thus cause trouble. This trouble is serious in that the upper board 22 steps down and locks the brake lever and other levers so they cannot be controlled without resulting accidents of which many are of record. The object of this invention is to provide means, salable as an independent specialty which can, at small expense, be supplied to users of cars having floor boards of the class described to be applied by them to securely and yet detachably hold the boards in proper place without the difficulties which have heretofore existed.

The invention consists in means capable of carrying out the foregoing objects, which can be easily and cheaply made, which is satisfactory in operation, and is not readily liable to get out of order. More particularly the invention consists in many features and details of construction hereafter more fully set forth in the specification and claim.

Referring to the drawings in which like numerals represent the same parts throughout the several views, Figure 1 is a side view of the central body portion of an automobile having the objectionable floor boards showing the same in section, and the application of this invention thereto.

Fig. 2 is a side view from the left of the boards shown in Fig. 1 showing the boards removed from the automobile.

Fig. 3 is a sectional view on the line 3—3 of Fig. 2.

Fig. 4 is an enlarged plan view of the securing device of this invention.

Fig. 1 shows the hood 10, floor frame 12, and seat 14 of a conventional type of automobile now on the market in large quantities. This floor frame 12 is covered by horizontal board 16 terminating in inclined frame 18 on which are mounted two removable boards 20 and 22 fitting together in the break joint 24. These boards are perforated in the openings 26 for the various foot levers to be engaged by the operator sitting upon the seat 14.

In solving the problem of detachably and rigidly securing the two boards 20 and 22 together the button plate 28 of Fig. 4 is provided, the same having at one end a pivot hole 30 and intermediate of its length toward the other end at least three notches 32, 34 and 36. A pivot screw 38 is placed through opening 30 and inserted in one of the boards, in the particular case illustrated in the drawings, board 22. A headed pin 40 adapted to fit in notch 32 is also placed in board 22. Two other headed pins 42 are placed in board 20 adapted to fit in notches 34 and 36 respectively. All the parts are so arranged that when the mechanism is in the position of Fig. 2 these members 28 retain the boards in position against a pressure on either board perpendicular to the board tending to separate the two boards but they are also so placed that by swinging the buttons 28 so that notches 32, 34 and 36 clear the pins 40 and 42 the boards can be easily removed.

The strap or button 28 and the necessary screws 38 and pins 40 and 42 can be sold as independent articles of manufacture and applied by the user of the car for the purposes set forth.

Having thus described my invention what I claim as new and desire to secure by Letters Patent, is:—

In combination with two meeting floor boards of an automobile, a member overlapping said boards and pivoted to one of them, there being in said overlapping member at least one notch adjacent to the board to which it is pivoted and at least two notches adjacent to the board to which it is not pivoted, and headed pins on said boards engaging said notches, for the purposes set forth.

In witness whereof, I have hereunto subscribed my name in the presence of two witnesses.

CLARENCE H. ROCKEY.

Witnesses:
DWIGHT B. CHEEVER,
ANNA ROSENTHAL.